(12) United States Patent
Piednoel

(10) Patent No.: US 12,517,851 B2
(45) Date of Patent: Jan. 6, 2026

(54) SYSTEM ON CHIP FOR FREEDOM FROM INTERFERENCE

(71) Applicant: MERCEDES-BENZ GROUP AG, Stuttgart (DE)

(72) Inventor: Francois Piednoel, Sunnyvale, CA (US)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/600,145

(22) Filed: Mar. 8, 2024

(65) Prior Publication Data

US 2025/0284650 A1 Sep. 11, 2025

(51) Int. Cl.
*G06F 13/42* (2006.01)
*G06F 13/38* (2006.01)
(52) U.S. Cl.
CPC ........ *G06F 13/382* (2013.01); *G06F 13/4282* (2013.01); *G06F 2213/3808* (2013.01)
(58) Field of Classification Search
None
See application file for complete search history.

(56) References Cited

U.S. PATENT DOCUMENTS

| | | | | |
|---|---|---|---|---|
| 6,285,208 B1 * | 9/2001 | Ohkubo | ........... | H03K 19/00346 326/82 |
| 11,870,682 B2 | 1/2024 | Ronen | | |
| 2017/0302739 A1 | 10/2017 | Hughes | | |
| 2018/0069696 A1 * | 3/2018 | Yoo | ..... | H04L 63/0428 |
| 2018/0205671 A1 | 7/2018 | Hung | | |
| 2020/0127936 A1 | 4/2020 | Luo | | |
| 2020/0201335 A1 | 6/2020 | Somers et al. | | |
| 2020/0327023 A1 | 10/2020 | Hayes et al. | | |
| 2021/0179136 A1 * | 6/2021 | Kim | ....... | G06V 10/80 |
| 2022/0057798 A1 | 2/2022 | Costin et al. | | |
| 2022/0169270 A1 | 6/2022 | Wei et al. | | |
| 2022/0274610 A1 | 9/2022 | Chen | | |
| 2022/0412974 A1 * | 12/2022 | Tabib-Azar | ...... | G01N 33/56983 |
| 2023/0132724 A1 | 5/2023 | Shah | | |
| 2025/0190386 A1 | 6/2025 | Govindachar | | |

OTHER PUBLICATIONS

International Search Report with Written Opinion of the International Searching Authority for the Application No. PCT/EP2025/053664 mailed Mar. 28, 2025.

* cited by examiner

*Primary Examiner* — Henry Tsai
*Assistant Examiner* — Dean Phan
(74) *Attorney, Agent, or Firm* — Mahamedi IP Law LLP

(57) ABSTRACT

A system on chip for freedom from interference includes a sensor data input chiplet to obtain sensor data from a number of sensors, memory storage locations, and a network on chip. Network interface units of the network on chip route the sensor data to the memory storage locations. A first set of the network interface units routes data of the first type along a first path to a first memory storage location, a second set of the network interface units routes data of a second type along a second path to a second memory storage location, and one or more network interface units (which may also be referred to as one or more interference prevention NIUs) prevent interference between the first path and the second path.

15 Claims, 5 Drawing Sheets

SYSTEM ON CHIP FOR FREEDOM FROM INTERFERENCE

BACKGROUND

Universal Chiplet Interconnect Express (UCIe) provides an open specification for an interconnect and serial bus between chiplets, which enables the production of system-on-chip (SoC) packages with intermixed components from different silicon manufacturers. It is contemplated that autonomous vehicle computing systems may operate using chiplet arrangements that follow the UCIe specification.

SUMMARY

A system-on-chip (SoC) can include a sensor data input chiplet that obtains sensor data from a sensor system (e.g., a sensor system of an autonomous vehicle). A primary goal of advancing autonomous vehicle technology is increasing the automotive safety integrity level (ASIL) of various electric and electronic (E/E) components of vehicles that are relevant to autonomous vehicle functions. One method of increasing the ASIL of autonomous drive features and functions is to provide freedom from interference between components to minimize random hardware errors and systematic hardware and software errors.

ISO 26262 defines freedom from interference as the absence of cascading failures between two or more elements that could lead to the violation of a safety requirement. An "element" is a system or part of a system including components, hardware, software, hardware parts, and software units, and a cascading failure is any failure of an element causing another element of the same item to fail. ISO 26262 specifies three types of interference: timing and execution, memory, and exchange of information. Interferences in the memory space domain occur when a software element accesses or modifies code or data belonging to another software element. Interferences due to exchange of information are sender and receiver related and are caused by errors such as: repetition of information, loss of information, delay of information, insertion of information, blocking a communication channel, etc.

In accordance with examples provided herein, the sensor system of an autonomous vehicle can comprise any combination of cameras, LIDAR sensors, radar sensors, ultrasonic sensors, proximity sensors, and the like. Data from these sensor systems can be routed through network interface units comprising networks on chip of one or more systems on chip. The sensor data can be routed from the capturing sensor to one or more memory storage locations and from the memory storage location to one or more processing components in such a way as to maintain freedom from interference.

In some aspects, to ensure that the system on chip maintains freedom from interference, sensor data of a first type and sensor data of a second type are routed through different network interface units that do not share bandwidth with one another. For example, the data of the first type may be camera data, and the data of the second type may be radar or LIDAR data. Accordingly, a first set of network interface units route the data of the first type along a first path from the first sensors to a first memory storage location, and a second set of network interface units route the data of the second type along a second path from the second sensors to a second memory storage location. The network on chip further includes a central network interface unit that prevents interference between the first path and the second path.

The central network interface unit can also prevent interference in the network on chip between a third path from the first memory storage location to one or more processing components and a fourth path from the second memory storage location to the processing components.

In some examples, the network interface units are programmed to route the gathered sensor data based on a graph of a hardware architecture of the system and a software architecture of the system. The graph includes latency values between nodes in the graph, with at least some of the nodes representing the plurality of sensors, the plurality of processing components, and the set of memory storage locations. Nodes of the graph can include NIUs, interfaces, interconnects, DMA channels, caches, memory controllers, processing cores, etc. Connections between the nodes of the graph are weighted based on latency values representing data transfer times between components. These latency values can be taken from technical specifications or determined empirically through a testing process.

In some examples, the graph is in the form of a YAML file (or any other file describing a tree or graph of nodes) loaded into each of the NIUs of the system on chip. Each NIU is aware of its neighbors and routes data to the correct neighbor by looking up the target memory address in a routing table. A machine learning system can be used to create the routing tables by determining paths through the graph that minimize the latencies between the data collection nodes, data storage nodes, and data processing nodes.

While the central NIUs maintain freedom of interference during normal operation, they can allow data to pass through upon detection of a degradation event. For example, if a hardware failure is detected, a central NIU can be reconfigured into a bypass mode to allow data to be routed between the first path and the second path. The central NIU uses a first routing table during normal operation and a second routing table in the bypass mode. The central NIU is only authorized to reprogram into the bypass mode and use the second routing table if it receives a command from an ASIL-D device.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
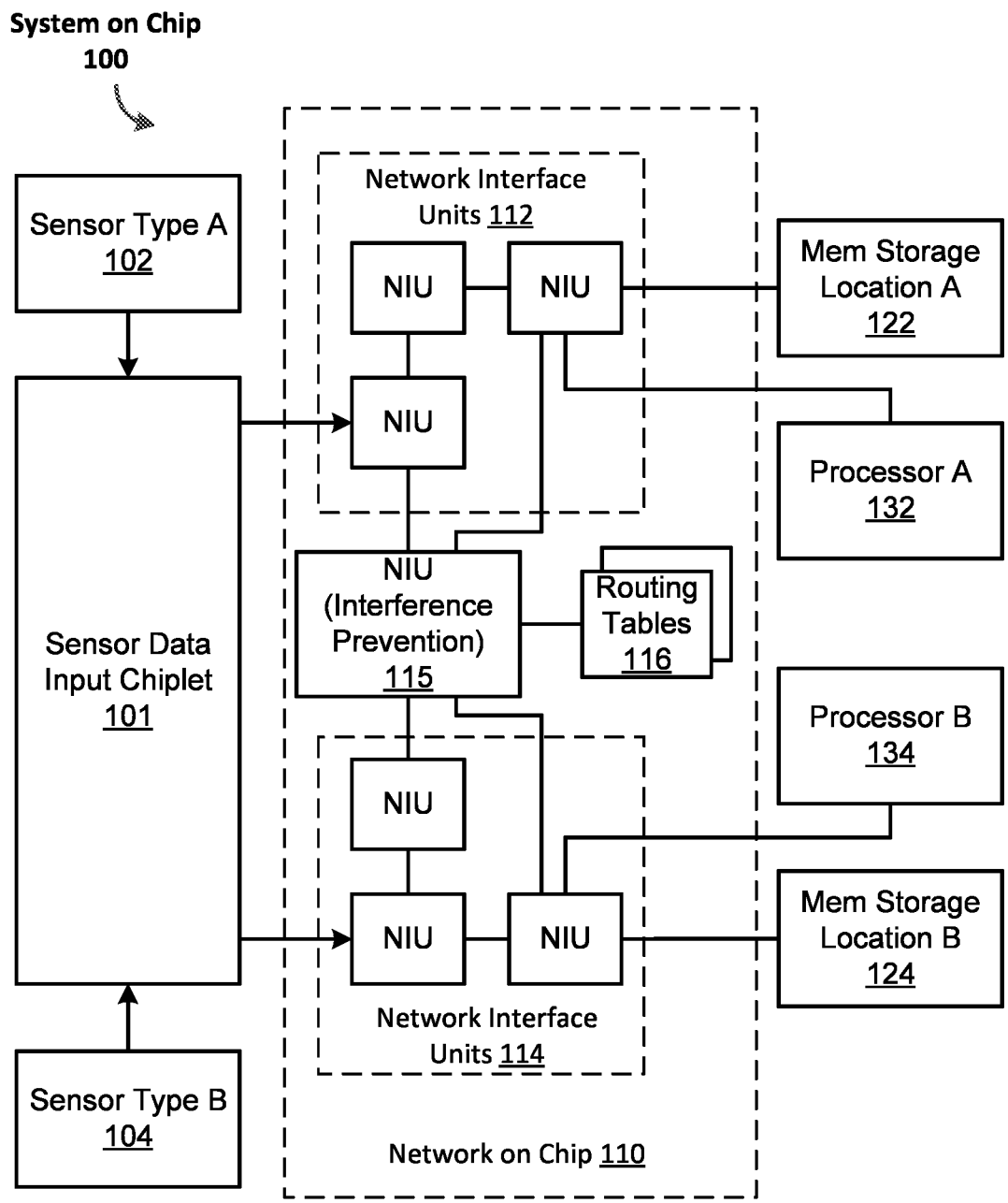
FIG. 1 is a block diagram depicting a system on chip providing freedom from interference, in accordance with some aspects.

A system on chip for freedom from interference includes a sensor data input chiplet to obtain sensor data, memory storage locations, and a network on chip. Network interface units of the network on chip route the sensor data to the memory storage locations. A first set of the network interface units routes data of the first type along a first path to a first memory storage location, a second set of the network interface units routes data of a second type along a second path to a second memory storage location, and one or more central network interface units prevent interference between the first path and the second path.

A primary goal of advancing autonomous vehicle technology is increasing the automotive safety integrity level (ASIL) of various electric and electronic (E/E) components of vehicles that are relevant to autonomous vehicle functions. One method of increasing the ASIL of autonomous drive features and functions is to provide freedom from interference between components to minimize random hardware errors and systematic hardware and software errors.

In certain implementations, example computing systems described herein can perform one or more functions described herein using a learning-based approach, such as by executing an artificial neural network (e.g., a recurrent neural network, convolutional neural network, etc.) or one or more machine-learning models. Such learning-based approaches can further correspond to the computing system storing or including one or more machine-learned models. In an embodiment, the machine-learned models may include an unsupervised learning model. In an embodiment, the machine-learned models may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

As provided herein, a "network" or "one or more networks" can comprise any type of network or combination of networks that allows for communication between devices. In an embodiment, the network may include one or more of a local area network, wide area network, the Internet, secure network, cellular network, mesh network, peer-to-peer communication link or some combination thereof and may include any number of wired or wireless links. Communication over the network(s) may be accomplished, for instance, via a network interface using any type of protocol, protection scheme, encoding, format, packaging, etc.

One or more examples described herein provide that methods, techniques, and actions performed by a computing device are performed programmatically, or as a computer implemented method. Programmatically, as used herein, means through the use of code or computer-executable instructions. These instructions can be stored in one or more memory resources of the computing device. A programmatically performed step may or may not be automatic. In some examples, a computing "apparatus" can comprise a computing system, such as a system of one or more servers, or an on-board, autonomous vehicle computing system. In variations, a computing apparatus can comprise a computing device, such as computing resources included on a circuit board, personal computer, smartphone computer, tablet computer, laptop, and the like.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers and/or personal computers using network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable mediums include permanent memory storage devices, such as hard drives on personal computers or servers. Other examples of computer storage mediums include portable storage units, such as flash memory or magnetic memory. Computers, terminals, network-enabled devices are all examples of machines and devices that utilize processors, memory, and instructions stored on computer-readable mediums. Additionally, examples may be implemented in the form of computer programs, or a computer usable carrier medium capable of carrying such a program.

In some embodiments, a computing system implementing the processes described herein can include one or more control circuits that may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), systems on chip (SoCs), or any other control circuit. In some implementations, the control circuit(s) and/or computing system may be part of, or may form, a vehicle control unit (also referred to as a vehicle controller) that is embedded or otherwise disposed in a vehicle (e.g., a Mercedes-Benz® car, truck, or van). For example, the vehicle controller may be or may include an infotainment system controller (e.g., an infotainment head-unit), a telematics control unit (TCU), an electronic control unit (ECU), a central powertrain controller (CPC), a central exterior & interior controller (CEIC), a zone controller, an autonomous vehicle control system, or any other controller (the term "or" may be used herein interchangeably with "and/or").

In an embodiment, the control circuit(s) may be programmed by one or more computer-readable or computer-executable instructions stored on the non-transitory computer-readable medium. The non-transitory computer-readable medium may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, for example, a computer diskette, a hard disk drive (HDD), a solid-state drive (SDD) or solid state integrated memory, a random access memory (RAM), a read-only memory (ROM), an erasable programmable read-only memory (EPROM or Flash memory), a static random access memory (SRAM), and/or dynamic random access memory (DRAM). In some cases, the non-transitory computer-readable medium may store computer-executable instructions or computer-readable instructions, such as instructions to perform the methods described throughout the present disclosure.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit to perform one or more functional tasks. The modules and computer-readable/executable instructions may be described as performing various operations or tasks when the control circuit(s) or other hardware components execute the modules or computer-readable instructions.

In further embodiments, the computing system can include a communication interface that enables communications over one or more networks to transmit and receive data. In various examples, the computing system can communicate, over the one or more networks, with fleet vehicles using the communication interface to receive sensor data and implement the intersection classification methods described throughout the present disclosure. In certain embodiments, the communication interface may be used to communicate with one or more other systems. The communication interface may include any circuits, components, software, etc. for communicating via one or more networks (e.g., a local area network, wide area network, the Internet, secure network, cellular network, mesh network, and/or peer-to-peer communication link). In some implementations, the communication interface may include for example, one or more of a communications controller, receiver, transceiver, transmitter, port, conductors, software and/or hardware for communicating data/information.

As an example embodiment, the control circuit(s) of the computing system can include a SoC arrangement that facilitates the various methods and techniques described throughout the present disclosure. In various examples, the SoC can include a set of chiplets, including a central chiplet comprising a shared memory in which a reservation table is utilized to execute various autonomous driving workloads, as described herein.

System Overview

FIG. 1 is a block diagram depicting an example system on chip 100 that provides freedom from interference. The system on chip 100 includes internal components such as a sensor input data chiplet 101 connected to sensor type A 102 and sensor type B 104, a network on chip (NoC) 110, memory storage locations (i.e., memory storage location A 122 and memory storage location B 124), and processors (i.e., processor A 132 and processor B 134).

In some aspects, a sensor data input chiplet 101 of the SoC 100 can receive sensor data from various vehicle sensors an autonomous vehicle. These vehicle sensors, including sensor type A 102 and sensor type B 104, can include any combination of image sensors (e.g., single cameras, binocular cameras, fisheye lens cameras, etc.), LIDAR sensors, radar sensors, ultrasonic sensors, proximity sensors, and the like. The sensor data input chiplet 101 processes the received sensor data as it is received and transmits the sensor data along one of many paths through the network on chip 110 to one or more memory storage locations. The sensor data input chiplet 101 can also include an image signal processor (ISP) responsible for capturing, processing, and enhancing images taken from the various vehicle sensors. The ISP takes the raw image data and performs a series of complex image processing operations, such as color, contrast, and brightness correction, noise reduction, and image enhancement, to create a higher-quality image that is ready for further processing or analysis by the other chiplets of the SoC 100. The ISP may also include features such as autofocus, image stabilization, and advanced scene recognition to further enhance the quality of the captured images. By doing so, the ISP can then store the higher-quality images in the memory storage locations.

In some aspects, the sensor data input chiplet 101 publishes identifying information for each item of sensor data (e.g., images, point cloud maps, etc.) to a shared memory of a central chiplet (not illustrated), which acts as a central mailbox for synchronizing workloads for the various chiplets. The identifying information can include details such as an address in the memory for the SoC 100 where the data is stored, the type of sensor data, which sensor captured the data, and a timestamp of when the data was captured.

To communicate with other chiplets of the SoC 100, the sensor data input chiplet 101 transmits data through one or more interconnects with the NoC 110. The NoC 110 is a communication architecture embedded within the SoC 100 to interconnect the internal components of the SoC 100 efficiently. In examples, the NoC 110 can employ a mesh or grid-like network topology to enable scalable and efficient communication between the components of the SoC 100.

In some aspects, the interconnects each represent die-to-die (D2D) interfaces between the chiplets of the SoC 100. The interconnects can include high-bandwidth data paths used for general data purposes to the memory storage locations and high-reliability data paths to transmit functional safety (FuSa) and scheduler information to the shared memory. Depending on bandwidth requirements, an interconnect may include more than one die-to-die interface to support higher bandwidth communications such as between the sensor data input chiplet 101 and the NoC 110.

The network interface units (NIUs) 112 and 114 are integral pieces of the NoC 110 architecture, serving as the bridge between the internal components of the SoC 100 and the communication network of the NoC 110. Their primary function is to facilitate communication between the internal components and the NoC 110 by providing the necessary protocol conversion, buffering, and arbitration. NIUs 112, 114 handle tasks such as packetization of data from the internal components into network packets, routing control, handling of flow control mechanisms, interfacing with the network routing logic, and managing communication protocols.

In one aspect, the interconnects implement the Universal Chiplet Interconnect Express (UCIe) standard, or other interconnect standards, and communicate through an indirect mode to allow each of the chiplet host processors (i.e., processor A 132 and processor B 134) to access remote memory as if it were local memory. This is achieved by using NIUs 112, 114 with hardware-level support for remote direct memory access (RDMA) operations. In UCIe indirect mode, the host processor sends requests to an NIU, which then accesses the remote memory and returns the data to the host processor. This approach allows for efficient and low-latency access to remote memory, which can be particularly useful in distributed computing and data-intensive applications. Additionally, UCIe indirect mode provides a high degree of flexibility, as it can be used with a wide range of different network topologies and protocols.

In some aspects, a first set of network interface units route data of a first type along a first path from the first sensors to a first memory storage location. For example, as illustrated, data from sensor type A 102 (e.g., camera image data) may be routed from the sensor data input chiplet 101 through the network interface units 112 to the memory storage location A 122. In addition, a second set of network interface units route data of a second type along a second path from the second sensors to a second memory storage location. For example, as illustrated, data from sensor type B 104 (e.g., radar data) may be routed from the sensor data input chiplet 101 through the network interface units 114 to the memory storage location B 124. An interference prevention NIU 115 (e.g., a central NIU disposed between the NIUs 112 and NIUs 114) provides freedom from interference between the first path and the second path in normal operation when not in a degradation or bypass mode.

In further aspects, the NIU 115 also prevents interference between a third path from the first memory storage location to the plurality of processing components and a fourth path from the second memory storage location to the plurality of processing components. For example, the NIU 115 may provide freedom from interference between a path between processor B 134 and memory storage location B 124 and a path between processor A 132 and memory storage location A 122.

Although illustrated as a single central NIU 115, there may be more than one NIU providing freedom from interference between the first path and the second path. The NIU 115 is disposed on the SoC 100 between the NIUs 112 and the NIUs 114, thus making it centrally located relative to those NIUs and the first and second paths through the NoC 110. However, the use of the term "central" is only for convenience of understanding and not meant to limit or constrain the actual placement of the NIU 115 with respect to the physical or logical layout of the SoC 100.

In some aspects, the NIUs 112, 114 and the NIU 115 are programmed to route the gathered sensor data based on a graph representation of (1) a hardware architecture of the SoC 100 and (2) a software architecture of the SoC 100. The NIUs, including the NIU 115, can store or convert the graph representation into a set of routing tables 116 that control data flow through the SoC 100. During normal operation, the NIU 115 uses a routing table 116 that provides freedom from interference between sensor data from the sensor type A 102 and the sensor type B 104 by preventing data from flowing through the NIU 115 from either the NIUs 112 or the NIUs 114. Accordingly, any degradation event affecting the NIUs 112 or memory storage location A 122 should have no effect on the SoC's capabilities to use data from sensor type B 104, and any degradation event affecting the NIUs 114 or memory storage location B 124 should have no effect on the SoC's capabilities to use data from sensor type A 102.

Figure 2:
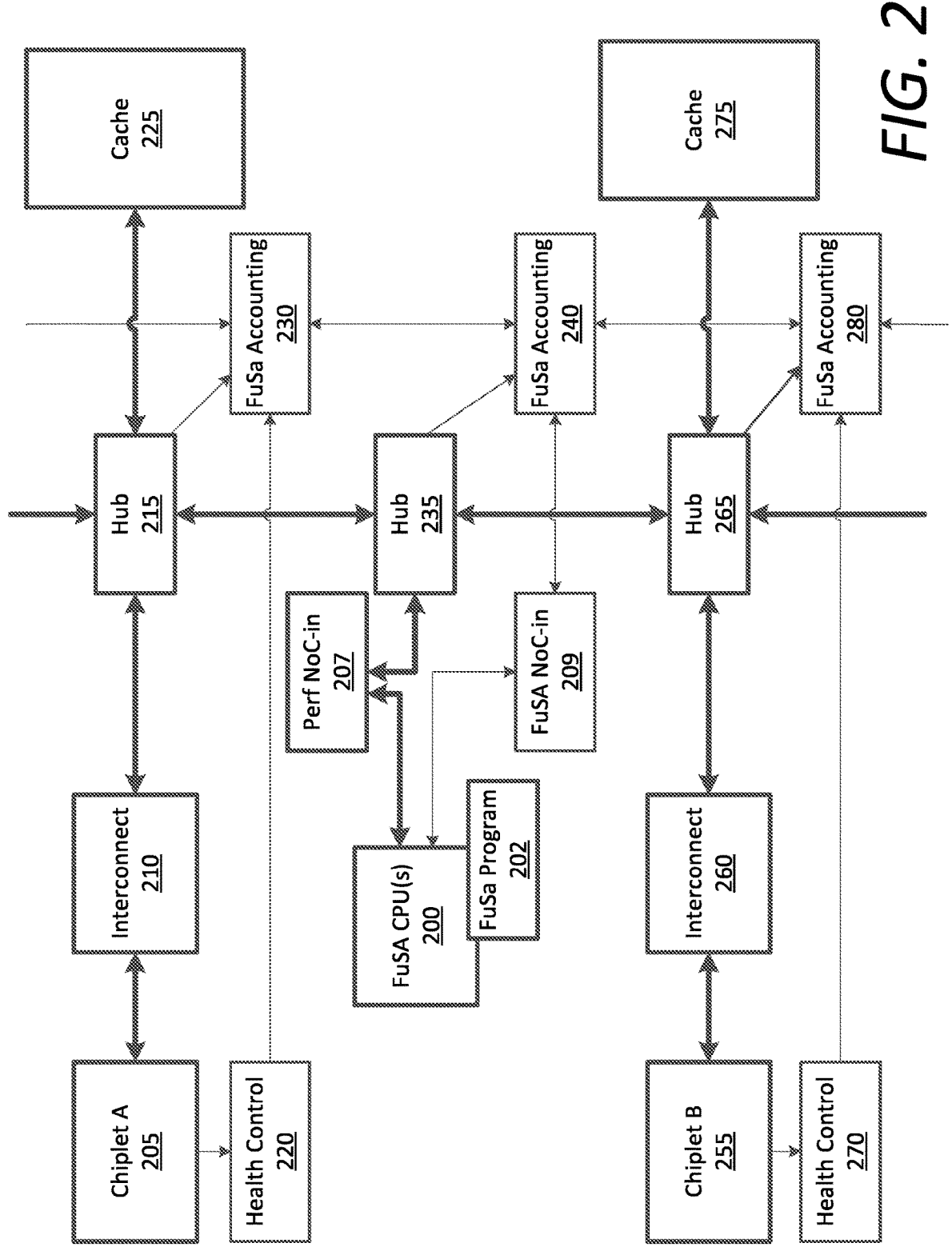
FIG. 2 is a block diagram depicting a performance network and a functional safety network for performing health monitoring, error correction, and system degradation, according to examples described herein.

FIG. 2 illustrates an example performance network and an example functional safety network for performing health monitoring, error correction, and system degradation.

In various examples, the FuSa CPU(s) 200 can be included on a central chiplet of an SoC. Each FuSa CPU 200 can execute a FuSa program 202. As described herein, execution of the FuSa program 202 can cause the FuSa CPU(s) 200 to perform primary and backup SoC monitoring tasks. Furthermore, in the example shown in FIG. 2, multiple chiplets of the SoC can communicate with each other over a high-bandwidth performance network comprising respective sets of interconnects (e.g., interconnect 210 and interconnect 260) and network hubs (e.g., network hubs 215, 235, and 265). As described herein, the multiple chiplets can comprise the sensor data input chiplet 101, a central chiplet, and workload processing chiplets that include processor A 132 and processor B 134 of FIG. 1, which may be represented by chiplet A 205, chiplet B 255, and any number of additional chiplets (not shown) in FIG. 2. Still further, the cache memories 225, 275 shown in FIG. 2 may represent memory storage locations such as memory storage location A 122 and memory storage location B 124 as shown and described with respect to FIG. 1.

In various examples, raw sensor data, processed sensor data, and various communications between chiplet A 205, chiplet B 255, and the FuSa CPU(s) 200 can be transmitted over the high-bandwidth performance network comprising the interconnects 210, 260, network hubs 215, 235, 265, and caches 225, 275. For example, if chiplet A 205 comprises a sensor data input chiplet, then chiplet A 205 can obtain sensor data from the various sensors of a vehicle and transmit the sensor data to cache 225 via interconnect 210 and network hub 215. In this example, if chiplet B 255 comprises a workload processing chiplet, then chiplet B 255 can acquire the sensor data from cache 225 via network hubs 215, 235, 265 and interconnect 260 to execute respective inference workloads based on the sensor data.

In certain implementations, the FuSa CPU(s) 200, through execution of the FuSa program 202, can communicate with the high-bandwidth performance network via a performance network-on-chip (NoC) 207 coupled to a network hub 235. These communications can comprise, for example, acquiring output data from independent pipelines to perform the comparison and verification steps described herein.

In some aspects, the interconnects 210, 260 are used as a high-bandwidth data path, used for general data purposes, to the cache memories 225, 275. Health control modules 220, 270 and FuSa accounting hubs 230, 240, and 280 are used as a high-reliability data path to transmit functional safety and scheduler information to the shared memory of the SoC. NoCs and network interface units (NIUs) on chiplet A 205 and chiplet B 255 can be configured to generate error-correcting code (ECC) data on both the high-bandwidth and high-reliability data paths. Each corresponding NIU on each pairing die has the same ECC configuration, which generates and checks the ECC data to ensure end-to-end error correction coverage.

According to various embodiments, the FuSa CPU(s) 200 communicates via a FuSa network comprising the FuSa accounting hubs 230, 240, 280 and health control modules 220, 270 via a FuSa NoC 209. As provided herein, the FuSa network facilitates the communication monitoring and error correction code techniques. As shown in FIG. 2, a FuSa accounting hub 230, 240, 280 can monitor communications transmitted through each network hub 215, 235, 265 of the high-bandwidth network. Each of chiplet A 205 and chiplet B 255 can communicate with or include a health control module 220, 270 through which ECC data, workload start and end communications, and scheduling information can be transmitted.

For the FuSa network data paths, the NIUs can transmit the functional safety and scheduler information through the health control modules 220, 270 in two redundant transactions, with the second transaction ordering the bits in reverse (e.g., from bit 31 to 0 on a 32-bit bus) of the order of the first transaction. Furthermore, if errors are detected in the data transfers between chiplet A 205 and chiplet B 255 over the high-reliability FuSa network, the NIUs can reduce the transmission rate to improve reliability.

In some aspects, the health control modules 220, 270 and FuSa accounting hubs 230, 240, 280 can detect and correct errors in real-time, ensuring that the CPUs continue to function correctly even in the presence of transient faults. For example, workload processing chiplet A and the central chiplet can perform an error correction check to verify that the processed data was sent and stored in the cache memories 225, 275 completely and without corruption. For example, for each processed data communication, the workload processing chiplets can generate an error correction code (ECC) using the processed data and transmit the ECC to the central chiplet. While the data itself is transmitted along a high-bandwidth performance network between chiplets, the ECC is sent along a high-reliability FuSa network via the FuSa accounting hubs 230, 240, 280. Upon receiving the processed data, the central chiplet can generate its own ECC using the processed data, and the FuSa CPU 200 can perform a functional safety call in the central chiplet mailbox to compare the two ECCs to ensure that they match, which verifies that the data was transmitted correctly.

In accordance with examples described herein, the FuSa CPU 200 and FuSa program 202 can further monitor communications in the performance network and reliability network for evidence that the system is experiencing a degradation event such as system overload, network latency, low bandwidth, and/or overheating. Upon detecting one or more of these issues, the FuSa program 202 can perform any number of mitigation measures, such as switching the primary and backup roles of SoCs in a multiple SoC arrangement, or initiating one or more system degradation processes.

In one example, the FuSa program 202 can execute a system degradation process that triggers the NIU 115 of FIG. 1 to enter a bypass mode. In this bypass mode, the NIU 115 may be reconfigured to allow data to be routed between the first and second paths, which are otherwise free from interference during normal, non-degraded operation. In bypass mode, the NIU 115 can use a secondary routing table that allows data to pass through, such as sensor data from sensor type B 104 to memory storage location A 122, which would normally be prevented.

Figure 3:
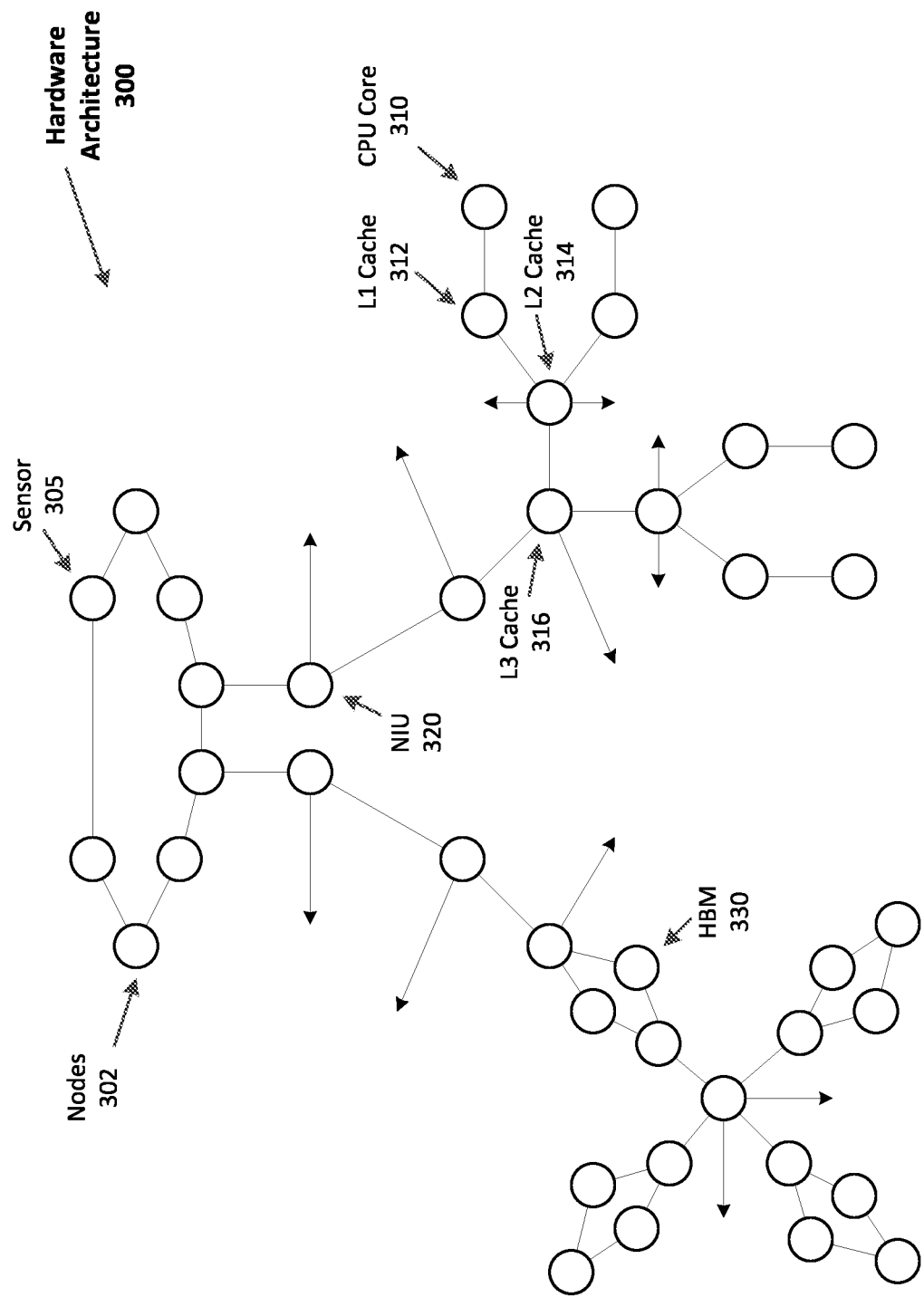
FIG. 3 depicts a hardware architecture including nodes representing components of a system on chip and links between those components, according to examples described herein.

FIG. 3 depicts an example hardware architecture 300 including nodes representing components of a system on chip and links between those components. The hardware architecture 300 shown in FIG. 3 can correspond to the arrangement of the plurality of sensors, the plurality of processing components, the set of memory storage locations, and the plurality of network interface units shown in FIG. 1. For example, at least some of the nodes can correspond to the sensor data input chiplet 101, the sensor type A 102, sensor type B 104, NIUs 112, NIUs 114, the NIU 115, memory storage location A 122, memory storage location B 124, processor A 132, and processor B 134.

In one aspect, the graph representation of the hardware architecture 300 is stored in, at least, the network interface units in the form of a data file, such as a YAML file, which is a human-readable data serialization format, or any file capable of representing a graph. The data file can include entries with unique identifiers for each of the nodes 302, such as sensors 305, NIUs 320, High-Bandwidth Memories 330, CPU cores 310, and caches including an L1 cache 312, L2 cache 314, and L3 cache 316. The data file can also include entries for each of the links in the graph, with each link entry specifying a source node, a target node, and a latency value for the link between those nodes. In some examples, the links between nodes 302 represent buses or paths through the NoC 110, and the latencies represent data transport times between the links.

In some aspects, the latency values are measured or simulated values. For example, initial latency values can be taken from technical specifications or determined empirically through a testing process. During operation of the SoC, actual latency values can be measured for the links, and the hardware architecture 300 and the graph representation can be updated with the newly measured latency values. Further, the NoC may reroute data through the SoC based on updated optimizations using the measured latency values, thus affecting where sensor data and other data is stored within the SoC.

Figure 4:
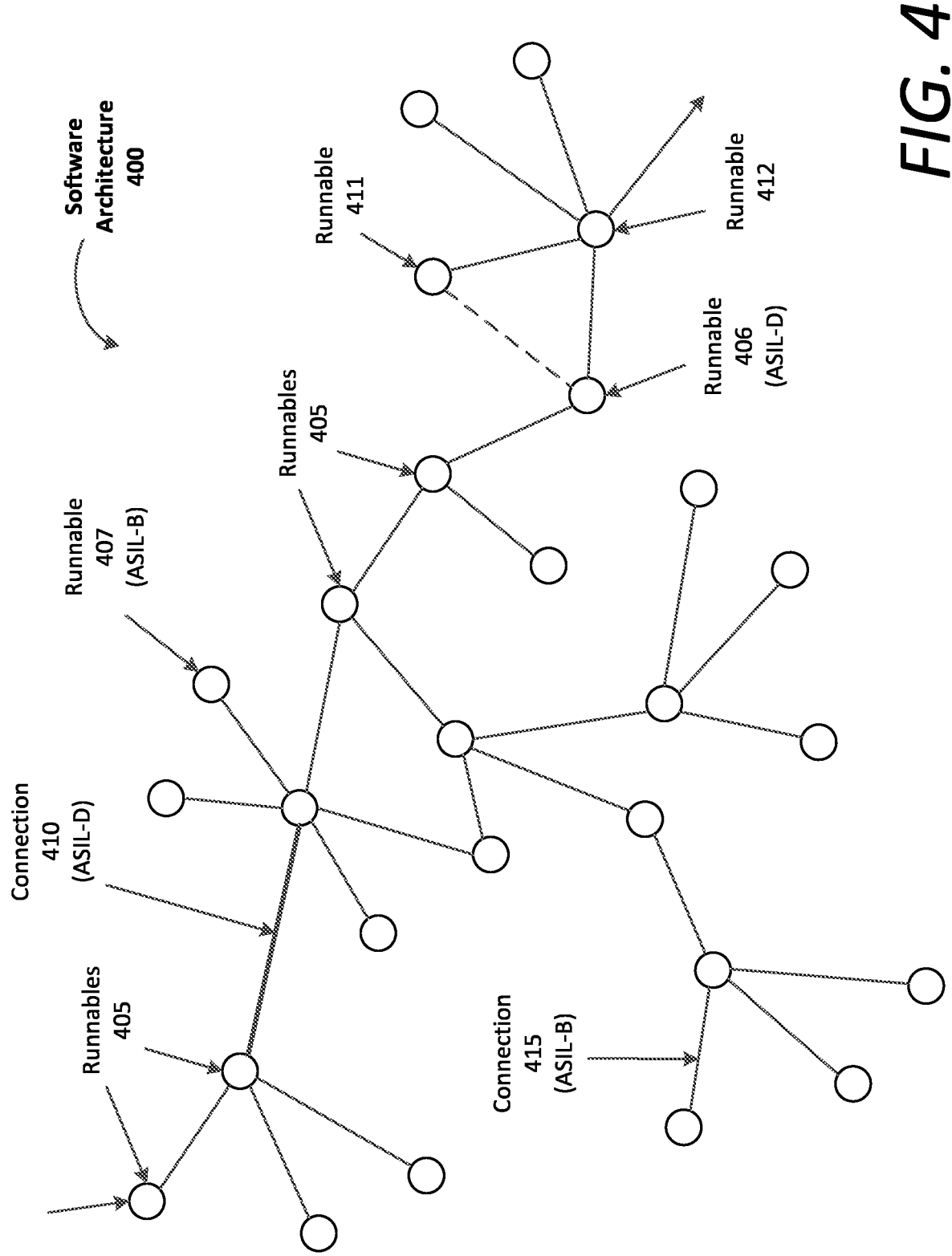
FIG. 4 depicts a software architecture including a set of runnables to be executed by workload processing chiplets, according to examples described herein.

FIG. 4 depicts an example software architecture including a set of runnables to be executed by workload processing chiplets. In various implementations, the runnables 405 can be executed by specified hardware components in accordance with the scheduling program and/or functional safety (FuSa) programs. For example, the FuSa program can monitor communications corresponding to execution of the runnables 405 by the set of workload processing chiplets, and trigger the degradation of the software structure upon detecting one or more degradation events, such as a system overload, processing delays, overheating, excess latency, etc.

The software architecture 400 shown in FIG. 4 can correspond to the autonomous driving software used to autonomously operate a vehicle, and is provided for illustrative purposes. Each of the runnables 405 of the software structure 400 can correspond to one or more workload entries in a reservation table. As such, when the dependencies of a particular workload entry are resolved, the workload can be executed as a runnable (e.g., by a specified workload processing chiplet) in an independent workload pipeline. Accordingly, the collective execution of the runnables 405 in the software architecture 400 can correspond to one or more autonomous driving tasks, such as perception, object detection and classification, scene understand, ML inference, motion prediction, motion planning, and/or autonomous vehicle control tasks.

As described herein, the FuSa program can monitor outputs of each workload pipeline to verify them with each other (e.g., to verify consistency between inference runnables). The FuSa program can further monitor communications within the performance network to determine whether any errors have occurred. Additionally, the FuSa program can degrade the execution of the software architecture 400 based on the safety ratings of the runnables 405 and/or connections between runnables 405 in the software architecture 400.

In accordance with examples described herein, the software architecture 400 can include safety ratings (e.g., ASIL ratings) for certain runnables and the connections between runnables 405. The connections between runnables can correspond to communications and/or dependencies that specified runnables have with each other in the software architecture 400. These associated safety ratings can dictate to the FuSa program and scheduling program which runnables, communications, and/or connections between runnables have priority of other runnables, communications, and/or connections when degradation of the system is required (e.g., through throttling to address overheating).

The safety ratings can further dictate the importance of the communications between the runnables 405 in terms of safety prioritization. For example, the connection 410 between two runnables having an ASIL-D rating can be prioritized over, say, the connection 415 between two runnables having an ASIL-B rating when degradation of the autonomous drive system is necessary. In such an example, when degradation of the system occurs, the communications or connection between the runnables having an ASIL-B rating can be degraded or throttled whereas the communication between the runnables having the ASIL-D rating can remain robust.

In further examples, each runnable or a subset of the runnables can be associated with a safety rating (e.g., an ASIL rating). As shown in FIG. 4, runnable 407 can be associated with an ASIL-B rating and can comprise a relatively non-essential compute task, whereas runnable 406 can be associated with an ASIL-D rating and can comprise a prioritized compute task. For example, runnable 407 can involve the classification of fire hydrants and/or curb colors in sensor data for the purpose of parking. Runnable 406 can involve motion prediction of pedestrians within proximity of the vehicle, and is therefore critical to the safety of those pedestrians.

For illustration, the software architecture 400 can be envisioned as an arrangement of nodes in a compute graph that correspond to the runnables 405, and connections (e.g., connection 410 and connection 415) between the nodes that represent the dependencies or communications between the runnables 405. It is contemplated herein that establishing safety ratings for runnables 405 and/or each connection between runnables 405 can facilitate in an adaptive degradation scheme designed to maintain a high level of safety for the overall autonomous drive system (e.g., an overall ASIL-D rating).

Furthermore, the connections 410 between each of the runnables 405 in the software architecture 400 and their ASIL ratings can be used, in combination with the hardware architecture 300, to create a graph representation which can then be used by the NoC 110 to efficiently route data through the SoC 100. For example, with knowledge of the runnables 405 and their connections 410 combined with hardware latency values from the hardware architecture 300, the NoC 110 can route sensor data and other processed data to be stored in caches and high-bandwidth memories closest, in terms of network latency, to where that data is collected and/or processed.

In some aspects, one or more graph traversal or search algorithms are applied to the graph representation to determine where the data should be stored and which path through the NoC 110 that data should take. For example, a given algorithm can use the latency values to calculate a lowest latency path through the graph. The algorithm(s) used can utilize machine learning and/or artificial intelligence-based techniques, both known and ones that may be subsequently developed.

Methodology

Figure 5:
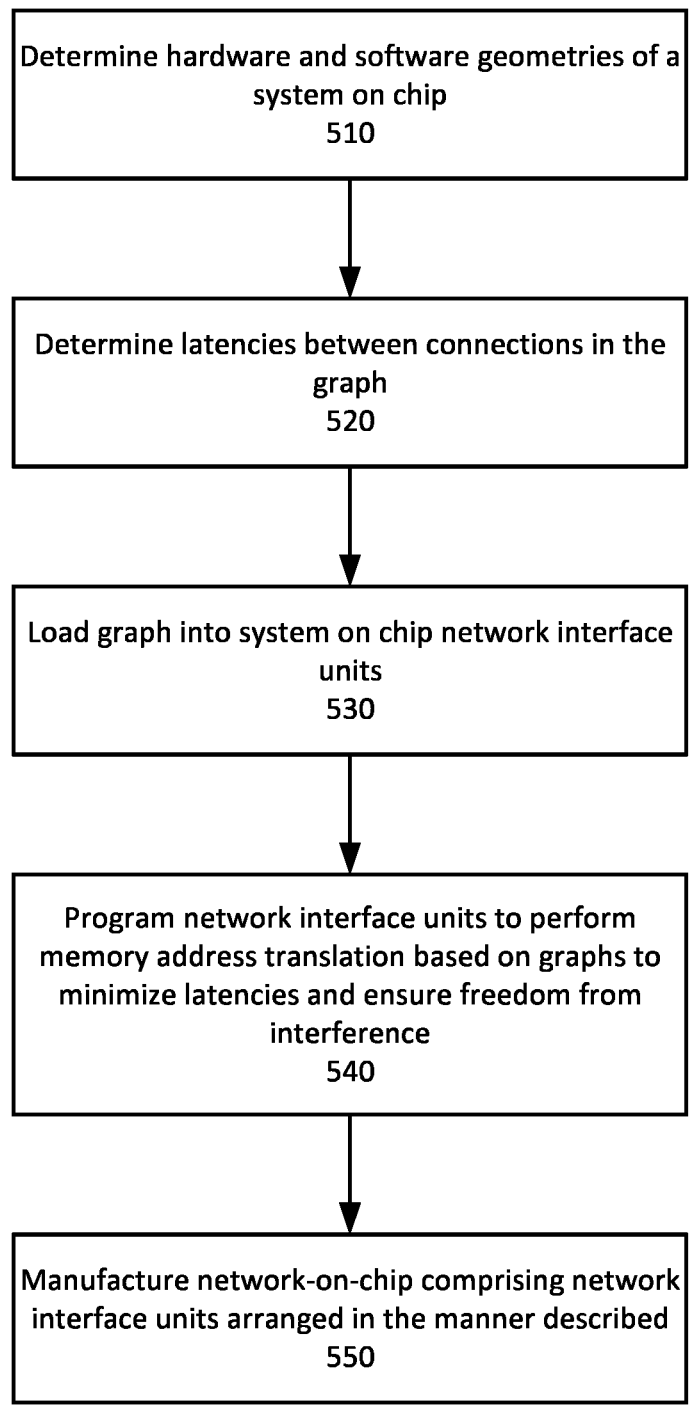
FIG. 5 is a flow chart describing an example method of providing freedom from interference in a system on chip.

FIG. 5 is a flow chart describing an example method of providing freedom from interference in a system on chip. While operations of the method are described below as being performed by specific components, modules or systems of the system on chip 100, it will be appreciated that these operations need not necessarily be performed by the specific components identified and could be performed by a variety of components and modules, potentially distributed over a number of machines. Accordingly, references may be made to elements of the system on chip 100 for the purpose of illustrating suitable components or elements for performing a step or sub step being described. Alternatively, at least certain ones of the variety of components and modules described in the system on chip 100 can be arranged within a single hardware, software, or firmware component. It will also be appreciated that some of the steps of this method may be performed in parallel or in a different order than illustrated.

With reference to an example of FIG. 5, the hardware and software geometries of a system on chip are determined (510). In some examples, these geometries are used to create a graph representation. Latencies between connections in the graph are determined (520). In some aspects, the latency values are measured or simulated values. For example, initial latency values can be taken from technical specifications or determined empirically through a testing process. During operation of the SoC, actual latency values can be measured for the links, and the hardware architecture and the graph representation can be updated with the newly measured latency values.

The graph representation can be loaded into network interface units of the system on chip, which may take the form of one or more routing tables (530). The graphs or routing tables may then be used to program the network interface units to route data and perform memory address translation to minimize latencies of data transport within the system on chip and ensure freedom from interference (540). In certain implementations, a method of manufacture can be performed based on the embodiments described herein. In particular, a semi-conductor manufacturing system may manufacture a network-on-chip (e.g., as a communications subsystem on an integrated circuit, chiplet, or other component on a system on chip) comprising the various arrangements of network interface units described herein (550). For example, a semi-conductor manufacturing system may manufacture an embodiment of a network-on-chip 110, including the arrangement of network interface units 112, 114, and interference prevention NIU 115 as shown and described with respect to FIG. 1.

It is contemplated for examples described herein to extend to individual elements and concepts described herein, independently of other concepts, ideas, or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature.

What is claimed is:

1. A system comprising:
    a sensor data input chiplet to obtain sensor data from a plurality of sensors, the plurality of sensors including first sensors to gather data of a first type and second sensors to gather data of a second type;
    a set of memory storage locations;
    a network on chip comprising a plurality of network interface units that route the gathered sensor data from the plurality of sensors to the memory storage locations based on a graph representation of (1) a hardware architecture of the system and (2) a software architecture of the system, the plurality of network interface units including (1) a first set of network interface units that route the data of the first type along a first path from the first sensors to a first memory storage location, (2) a second set of network interface units that route the data of the second type along a second path from the second sensors to a second memory storage location, and (3) one or more interference prevention network interface units, each of which is a network interface unit that prevents interference between the first path and the second path; and a plurality of processing components, wherein the one or more interference prevention network interface units prevent interference in the network on chip between a third path from the first memory storage location to the plurality of processing components and a fourth path from the second memory storage location to the plurality of processing components.

2. The system of claim 1, wherein the graph representation includes nodes that represent the plurality of sensors, the plurality of processing components, the set of memory storage locations, and the plurality of network interface units.

3. The system of claim 1, wherein the graph representation is stored as a data file in one or more of the plurality of network interface units and the plurality of processing components.

4. The system of claim 3, wherein the data file includes latency values between the nodes of the graph representation.

5. The system of claim 4, wherein the latency values represent data transport times between the plurality of sensors, the plurality of processing components, and the set of memory storage locations.

6. The system of claim 4, wherein the latency values are measured or simulated values.

7. The system of claim 4, wherein the latency values are periodically updated during system operation.

8. The system of claim 1, wherein the one or more interference prevention network interface units are reconfigured into a bypass mode to allow data to be routed between the first path and the second path upon detection of a degradation event.

9. The system of claim 8, wherein the one or more interference prevention network interface units use a first routing table during normal operation and a second routing table in the bypass mode.

10. A system comprising:
a sensor data input chiplet to obtain sensor data from a plurality of sensors, the plurality of sensors including first sensors to gather data of a first type and second sensors to gather data of a second type, wherein the data of the first type and the data of the second type are used to enable safe operation of an autonomous vehicle;
a set of memory storage locations; and
a network on chip comprising a plurality of network interface units that route the gathered sensor data from the plurality of sensors to the memory storage locations, the plurality of network interface units including (1) a first set of network interface units that route the data of the first type along a first path from the first sensors to a first memory storage location, (2) a second set of network interface units that route the data of the second type along a second path from the second sensors to a second memory storage location, and (3) one or more interference prevention network interface units, each of which is a network interface unit that prevents interference between the first path and the second path.

11. A system on chip comprising:
a sensor data input chiplet to obtain sensor data from a plurality of sensors to gather sensor data, the plurality of sensors including first sensors to gather data of a first type and second sensors to gather data of a second type;
a set of memory storage locations;
a network on chip comprising a plurality of network interface units that route the gathered sensor data from the plurality of sensors to the memory storage locations based on a graph representation of (1) a hardware architecture of the system on chip (2) a software architecture of the system on chip, the plurality of network interface units including (1) a first set of network interface units that route the data of the first type along a first path from the first sensors to a first memory storage location, (2) a second set of network interface units that route the data of the second type along a second path from the second sensors to a second memory storage location, and (3) one or more interference prevention network interface units, each of which is a network interface unit that prevents interference between the first path and the second path; and
a plurality of processing components,
wherein the one or more interference prevention network interface units prevent interference in the network on chip between a third path from the first memory storage location to the plurality of processing components and a fourth path from the second memory storage location to the plurality of processing components.

12. The system on chip of claim 11, wherein the graph representation includes nodes that represent the plurality of sensors, the plurality of processing components, the set of memory storage locations, and the plurality of network interface units.

13. The system on chip of claim 11, wherein the graph representation is stored as a data file in one or more of the plurality of network interface units and the plurality of processing components.

14. The system on chip of claim 13, wherein the data file includes latency values between the nodes of the graph representation.

15. The system on chip of claim 14, wherein the latency values represent data transport times between the plurality of sensors, the plurality of processing components, and the set of memory storage locations.

* * * * *